United States Patent [19]

Lunke et al.

[11] Patent Number: 5,066,263
[45] Date of Patent: Nov. 19, 1991

[54] RESILIENT SHAFT COUPLING

[75] Inventors: Manfred Lunke; Ulrich Falz, both of Dortmund; Jürgen Walter, Haltern, all of Fed. Rep. of Germany

[73] Assignee: Hackforth GmbH & Co. KG, Herne, Fed. Rep. of Germany

[21] Appl. No.: 608,291

[22] Filed: Nov. 2, 1990

[30] Foreign Application Priority Data

Nov. 17, 1989 [DE] Fed. Rep. of Germany ....... 3938261

[51] Int. Cl.$^5$ .............................................. F16D 3/68
[52] U.S. Cl. .......................................... 464/96; 464/99
[58] Field of Search ....................... 464/96, 98, 92, 87, 464/99, 162, 106

[56] References Cited

U.S. PATENT DOCUMENTS 2,207,496  7/1940  Anderson ............................... 464/96

FOREIGN PATENT DOCUMENTS 2202924  10/1988  United Kingdom .................. 464/96

*Primary Examiner*—Daniel P. Stodola
*Assistant Examiner*—Tony A. Gayoso
*Attorney, Agent, or Firm*—Robert W. Becker & Associates

[57] ABSTRACT

A resilient shaft coupling, especially for Diesel engine drives, essentially comprises two rigid coupling parts such as a hub on the drive side of the shaft coupling and a flange ring on the end of the drive shaft opposite to the drive side, whereby the hub and the flange ring are connected in an elastic rotating manner via a series of identical elastic annular connecting links. Radial supports for the elastic annular connecting links are provided at one of the rigid coupling parts in order to avoid improperly restraint masses that cause imbalance of the shaft due to centrifugal forces. In order to improve the angular movability of the resilient shaft coupling, the radial supports are provided with angular movability. This is achieved by a metallic ring membrane which provides angular movability between two axially neighboring annular connecting links, whereby the ring membrane is clamped between the connecting rims of the annular connecting links. The ring membrane is equipped with a boring, that tightly embraces the hub, and is thereby supported in a radially rigid, but axially and in a circumferential direction flexible fashion that also allows angular motion. The support at the hub is achieved by a sliding sleeve. Each metallic ring membrane may consist of one or more segments, successively arranged in its circumferential direction.

3 Claims, 3 Drawing Sheets

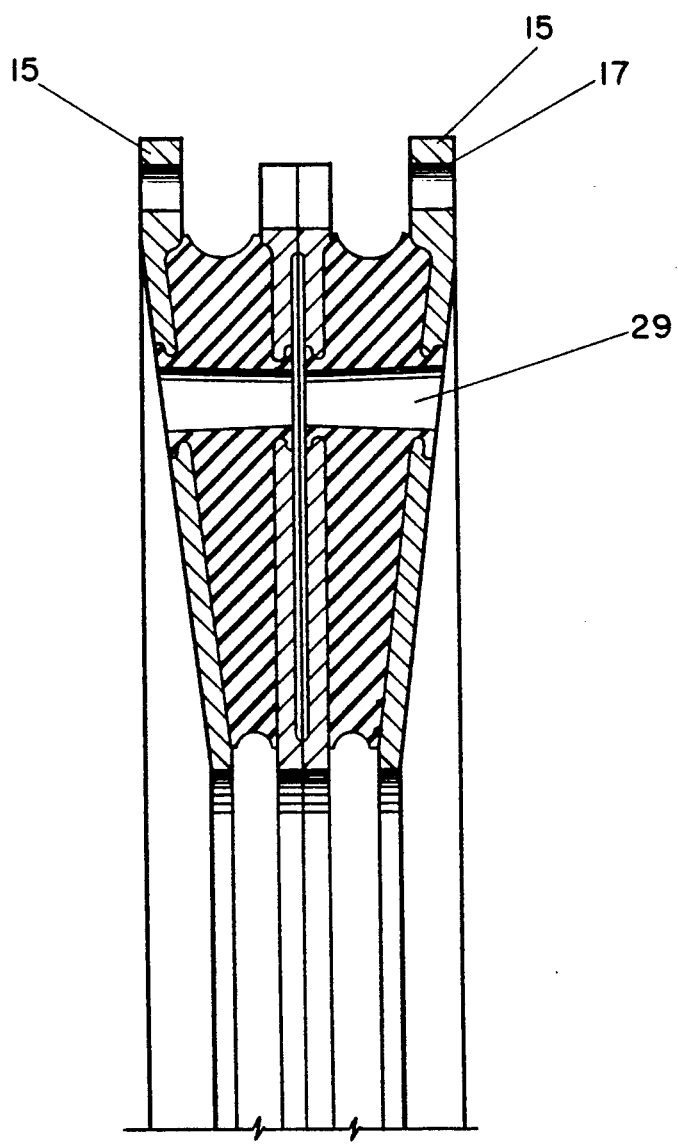
FIG — 3

RESILIENT SHAFT COUPLING

BACKGROUND OF THE INVENTION

The present invention relates to a resilient shaft coupling, such as for a diesel engine drive mechanism.

Various resilient shaft couplings with elastic annular connecting links between rigid coupling parts are known from the prior art. For example, U.S. Pat. No. 4,929,115 discloses an elastic shaft coupling with a single elastic annular connecting link. When extreme torsional resilience properties are desired, this may only be achieved with a series of elastic annular connecting links. In order to avoid improperly restrained masses that cause imbalance of the shaft due to centrifugal forces, the metallic ring membrane of the additional annular connecting links must be equipped with radial supports at least one rigid part of the shaft coupling, which allows for an axial and torsional resilience of the metallic ring membrane.

There is still a demand for an overall movability in axial, radial and angular directions in multi-row resilient shaft couplings. When angular motion occurs, a combination of axial and radial motions results at the shaft coupling, whereby the axial component is usually absorbed by an axially resilient metal coupling connected in series and the radial component is absorbed by elastomeric elements.

In a resilient shaft coupling comprising elastic annular connecting links in series, as described above, radial and axial motions may only be absorbed by the first elastic annular connecting link that bridges the dividing plane of the shaft, because the angular movability of the following annular connecting links is blocked by a rigid radial support at one of the two rigid coupling parts. Therefore, the respective first elastic annular connecting link, and respectively its ring half, determines the total angular movability of the elastic shaft coupling.

In such resilient shaft couplings, the resulting forces, caused by the angular motions and occurring at the first of the series of elastic annular connecting link, influence the successive annular connecting links. This causes unexpected problems in these shaft couplings in comparison with a simple elastic shaft coupling, i.e. a shaft coupling with only one single elastic annular connecting link, which may impair the angular movability as well as the functional safety of a multi-row resilient shaft coupling as a whole.

It is therefore an object of the present invention to provide a resilient shaft coupling comprising elastic annular connecting links connected in series with radial supports that do not impair the angular movability of the entire coupling in comparison with a simple elastic shaft coupling.

BRIEF DESCRIPTION OF THE DRAWINGS

This object, and other objects and advantages of the present invention, will appear more clearly from the following specification in conjunction with the accompanying drawings, in which:

FIG. 3 shows two ring halves of an annular connecting link of FIG. 1 in detail.

SUMMARY OF THE INVENTION

The resilient shaft coupling of the present invention is primarily characterized by a metallic ring membrane which is clamped between circumferential rims of two axially neighboring annular connecting links and is supported at the hub by a boring, that tightly embraces the hub, in a radially rigid, but axially and in a circumferential direction flexible fashion that also allows angular motion.

In a preferred embodiment of the radial support, a radially extending flange ring of a sliding sleeve is screwed to the boring of each individual metallic ring membrane. The sliding sleeve is supported at the hub in an axially movable and rotatable fashion.

The individual metallic ring membranes preferably consist of two or more ring membrane segments, so that an exchange of defective ring membranes may be carried out without demounting the shaft coupling.

It is also advantageous that, by maintaining the rigid radial support and introducing metallic ring membranes with angular movability, the single elastic annular connecting links are able to adapt to the movements of the first successive elastic annular connecting links connected in series, that are created by angular motions. Thereby the angular movability of the entire shaft coupling is positively influenced and substantially improved. It is also advantageous, that, in the common construction of the single elastic annular connecting links with two mirror-symmetrical ring halves only one metallic ring membrane with an angular movability is necessary between two axially neighboring elastic annular connecting links. A radial support of the respective central metallic ring plates of the abutting halves of an elastic annular connecting link is unnecessary.

DESCRIPTION OF THE PREFERRED EMBODIMENTS

The present invention will now be described in detail with the aid of several specific embodiments utilizing FIGS. 1 through 3.

Figure 1:
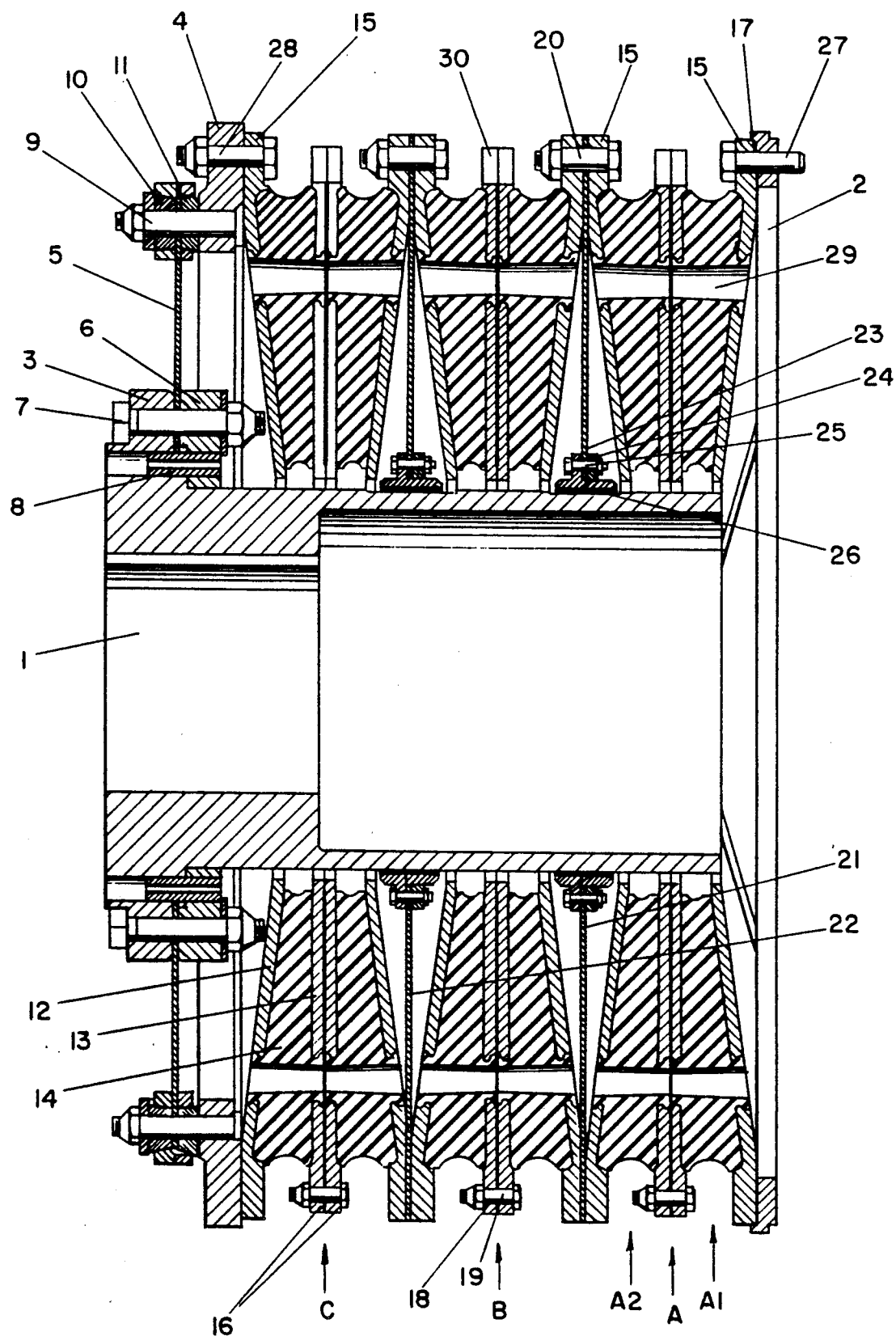
FIG. 1 is an axial cross-sectional view of a resilient shaft coupling in the plane of the lines I—I of FIG. 2.
Figure 2:
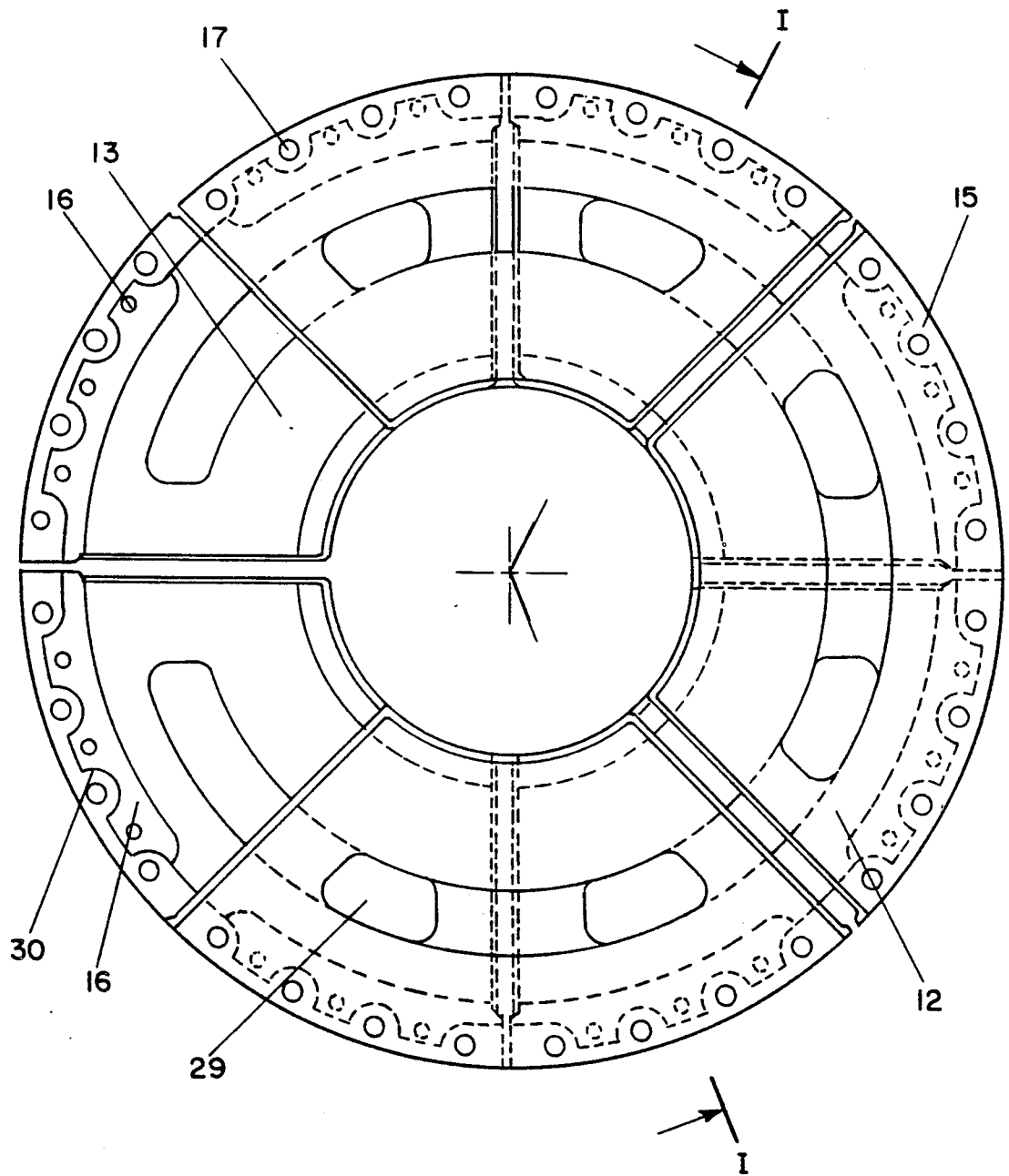
FIG. 2 is an end view of the first elastic annular connecting link, with one segment of the first half missing, without the flange ring, which, besides the hub, forms the second rigid coupling portion of the shaft coupling.

The embodiment of the present invention, as shown in the FIGS. 1 and 2, represents a resilient shaft coupling with three identical annular connecting links connected in series. One rigid coupling portion is formed as a hub 1 which extends axially to the vicinity of the second rigid coupling portion in the form of a flange ring 2. At the outer end of the hub 1 there is an outer flange 3 formed as an integral part which serves to fasten a catch 4. The intermediary member between the outer flange 3 and the catch 4 is a diaphragm ring 5 made from spring steel. This diaphragm ring 5 allows for a certain axial movability between the hub 1 and the flange ring 2, which is necessary to compensate for possible axial misalignments of the shafts to be connected.

The diaphragm ring 5 is clamped in a non-rotatable manner at the outer flange 3 via a clamping ring 6. The clamping power is obtained by a number of clamping bolts 7, which are held in through holes that are successively distributed, equally spaced, at the circumference of the outer flange 3 and the clamping ring 6. On inner circles of the outer flange 3 and the clamping ring 6 there are provided further through holes which hold conventional, aligned clamping sleeves 8 in a force-locking manner. The clamping sleeves 8, together with the clamping bolts 7, connect the outer flange 3 and the clamping ring 6 in a fixed manner.

The catch 4 is provided with a number of through holes on an inner circle that each hold a connecting bolt 9. The ends of the connecting bolts 9 extend past the through holes and each penetrate a respective bearing element 10 with limited resilience. The bearing element 10 with limited resilience is positioned in a boring of a connecting ring 11, which is connected in a flexible manner to the diaphragm ring 5 via the bearing element 10 with limited resilience. This embodiment allows for a flexible movability of the diaphragm ring 5 in a direction opposite to the axial direction, without causing lateral strain on the connecting bolt 9 and the catch 4.

The parts described above form a metal coupling which is rotation-fast but axially and angularly flexible. This metal coupling may also be formed as a conventional bracket-type coupling.

For the torsional resilience of the shaft coupling three elastic annular connecting links A, B, C are connected in series. Each individual elastic annular connecting link comprises two identical ring halves which, relative to their dividing plane which is perpendicular to the rotation axis of the shaft coupling, abut in a mirror-symmetrical fashion. Each ring half of the annular connecting links A, B, C, for example, A1 and A2, is divided into the same number of ring segments which are arranged successively in its circumferential direction. In this preferred embodiment, each ring half A1 and A2 consists of four identical ring segments. The cross-sectional shape of the inner and outer metallic ring segments 12 and 13 that belong to one ring half is represented in FIG. 2. Between the congruent metal ring segments 12, 13, of a ring half A1 or A2 rubber segments 14 of an identical surface area are vulcanized, as an integral part, onto the inner wall surfaces of the metallic ring segments 12 and 13.

The axial plane of the elastic annular connecting links A, B, C has the trapezoidal cross-sectional shape as demonstrated in FIG. 1, which is known from conventional couplings. This shape serves to conserve rubber material and also reduces the weight of the part.

The metallic ring segments 12, 13, at their circumference, have radially extending connecting rims 15, 16, which extend past the rubber segments 14 (see FIG. 3). Each connecting rim has a number of through holes 18 which are successively distributed, equally spaced, over its circumference. The segments of the two ring halves of each annular connecting link A, B or C are staggered by the width of a half segment. When the segments are arranged accordingly and tightly clamped via the outer connecting rims 16 of the inner abutting metallic ring segments 13 via screw bolts 19, a closed ring body is formed, i.e., an individual closed annular connecting link A, B or C. The annular connecting links formed in this manner are adjoined into a series and connected, as demonstrated in FIG. 1. Clamping is achieved by screw bolts 20 which are arranged in a force-locking manner in two respective through holes 17 in the outer rims 15 of two respective adjoining annular connecting links A and B or B and C. The outer connecting rims 15 of the outer metallic annular connecting links 12 are perpendicular to the rotation axis and have outer contact surfaces that are plane parallel to a plane perpendicular to the rotation axis and also to the contact surfaces at the flange ring 2 and the catch 4.

Between the outer contact surfaces of the ring segments 12 of two neighboring annular connecting links, A and B or B and C, the circumferential portion of a metallic ring membrane 21, 22 with angular mobility is clamped. The metallic ring membrane has an inner boring, respectively a circular opening, which tightly embraces the outer mantle surface of the hub 1 by the following means: a flange ring 23 is clamped to the vicinity of the inner boring via a pressure ring 24 and a number of screw bolts 25; the flange ring 23 is formed as an integral part of a sliding sleeve 26, which is supported at the outer mantle surface of the hub 1 in a rotatable and in an, to a limited extent, axially movable manner. The support of the annular connecting links A, B, C at the hub 1 is therefore radially rigid, but of a limited angular movability.

The annular connecting inks A, B, C, connected in series in a fixed manner, represent the torsionally resilient connection between the flange ring 2 and the hub 1. Their axial outer connecting rims 15 are attached in a fixed manner via screw bolts 27, 28 to the flange ring 2 on the one hand and to the catch 4 on the other hand.

As shown in the drawings, each individual ring segment is provided with axially extending perforations 29, which are extending from one outer face to the opposite outer face, thereby congruently penetrating the outer metallic ring segments 12, 13 and the inner rubber segment 14.

In the circumferential direction the perforations 29 may be shaped to various lengths. Their lengths, however, must be such, that for the staggered arrangement of the ring segments in the two ring halves of the annular connecting links A, B, C, the perforations 29 are at least partially overlapping, whereby the overlapping areas provide a passage from one outer face through to the other outer face of the elastic annular connecting links A, B, C. These perforations serve as ventilation channels, which improve the heat dissipation from the core area of the individual rubber bodies 14.

The outer rim 16 of the inner metallic ring segment 13 is equipped with recesses 30 of a semicircular shape. The number of recesses 30 corresponds to the number of through holes 17 in the outer metallic ring segments 12. The through holes 17 and the recesses 30 are axially aligned. Due to the recesses 30 the screw bolts 20, 27, 28 may be easily inserted and/or removed from a shaft coupling which is in operation. The elastic annular connecting links A, B, C may be changed completely or partially at the site of operation. If necessary, respective recesses may also be provided at the circumferential rims 15 of the outer metallic ring segments 12, for example, for axially narrow halves of the annular connecting links A, B, C.

As demonstrated in FIG. 1, the first of the successive elastic annular connecting links, A, is fixed in a radially rigid manner via its metallic ring segments 12 to the hub 1 on the one hand and the flange ring 2 on the other hand. This elastic annular connecting link a thereby bridges the junction between the connected shafts and determines entirely the flexibility properties of the resilient shaft coupling due to its own radial and angular movability. The forces, created when an angular motion at the first elastic annular connecting link A occurs, are transmitted to the additional annular connecting links B and C and may accordingly be absorbed by the metallic ring membranes 21 and 22 that are flexible in an angular motion.

This novel, radially and angularly flexible support of the additional elastic annular connecting links may also be employed for shaft couplings which have annular connecting links, connected in series, of a different structure, for example, rubber segments of a different cross-sectional shape or formed as one-piece closed rings.

The present invention is, of course, in no way restricted to the specific disclosure of the specification, examples and drawings, but also encompass any modifications within the scope of the appended claims.

What we claim is:

1. A resilient shaft coupling essentially comprising a hub on a drive side of said shaft coupling, a flange ring on an end of said drive shaft opposite to said drive side, said hub and said flange ring being connected in a torsionally resilient manner via a series of identical elastic annular connecting links, connected in series, which annular connecting links are formed by two abutting ring halves that are mirror-symmetrical to a dividing plane perpendicular to a rotation axis of said shaft coupling, each said ring half being provided with outer metallic ring plates, which are composed of congruent ring segments whereby said congruent ring segments are connected by rubber segments of identical surface areas which are vulcanized to said ring segments and have in their axial plane a trapezoidal cross-sectional shape with a radially outwardly increasing width, with said ring segments of said one ring half being staggered, and said outer metallic ring plates of said two abutting respective ring halves at said dividing plane being clamped at first connecting rims, and adjoining ones of said outer metallic ring plates of neighboring ones of said annular connecting links being clamped at second connecting rims, with a radial support being also provided at said hub; said resilient shaft coupling further comprising:

a metallic ring membrane being clamped between said second connecting rims of each two of said neighboring ones of said annular connecting links, with each of said ring membranes having a boring, that tightly embraces said hub through sliding means, so as to support said ring membrane at said hub in a radially rigid, but axially and in a circumferential direction flexible fashion that also allows angular motion.

2. A resilient shaft coupling according to claim 1, in which a radially extending flange ring of a sliding sleeve that is supported at said hub is secured to each said metallic ring membrane in the vicinity of said boring, with said sliding sleeve effecting said tight embracement of said hub.

3. A resilient shaft coupling according to claim 1, in which each of said metallic ring membranes is comprised of at least two ring membrane segments, successively arranged in a circumferential direction.

* * * * *